Jan. 1, 1952
R. MacHENRY ET AL
2,580,566
BRA FORMING DEVICE
Filed Sept. 4, 1948
2 SHEETS—SHEET 1
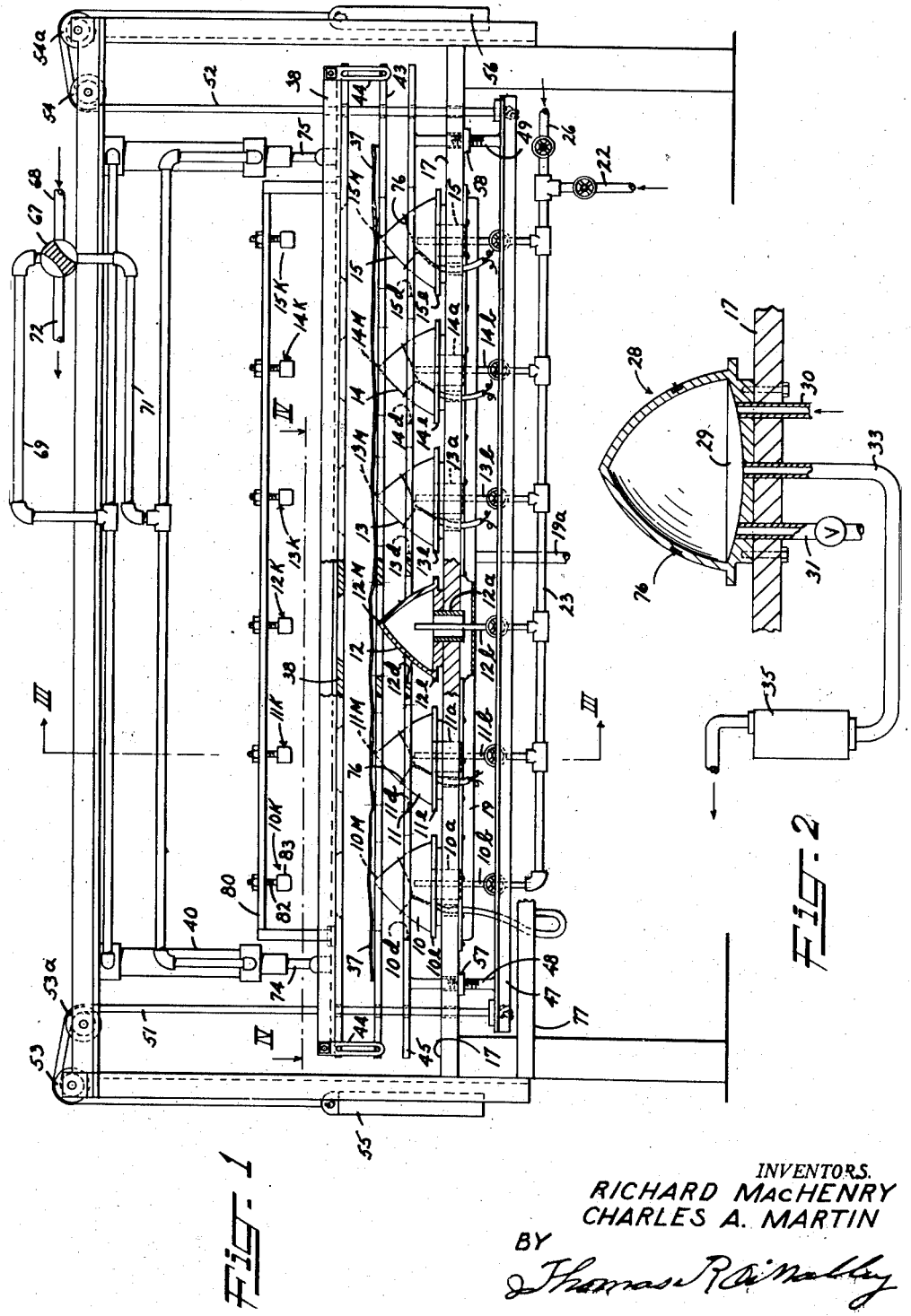
INVENTORS.
RICHARD MacHENRY
CHARLES A. MARTIN
BY Jan. 1, 1952    R. MacHENRY ET AL    2,580,566
BRA FORMING DEVICE
Filed Sept. 4, 1948    2 SHEETS—SHEET 2
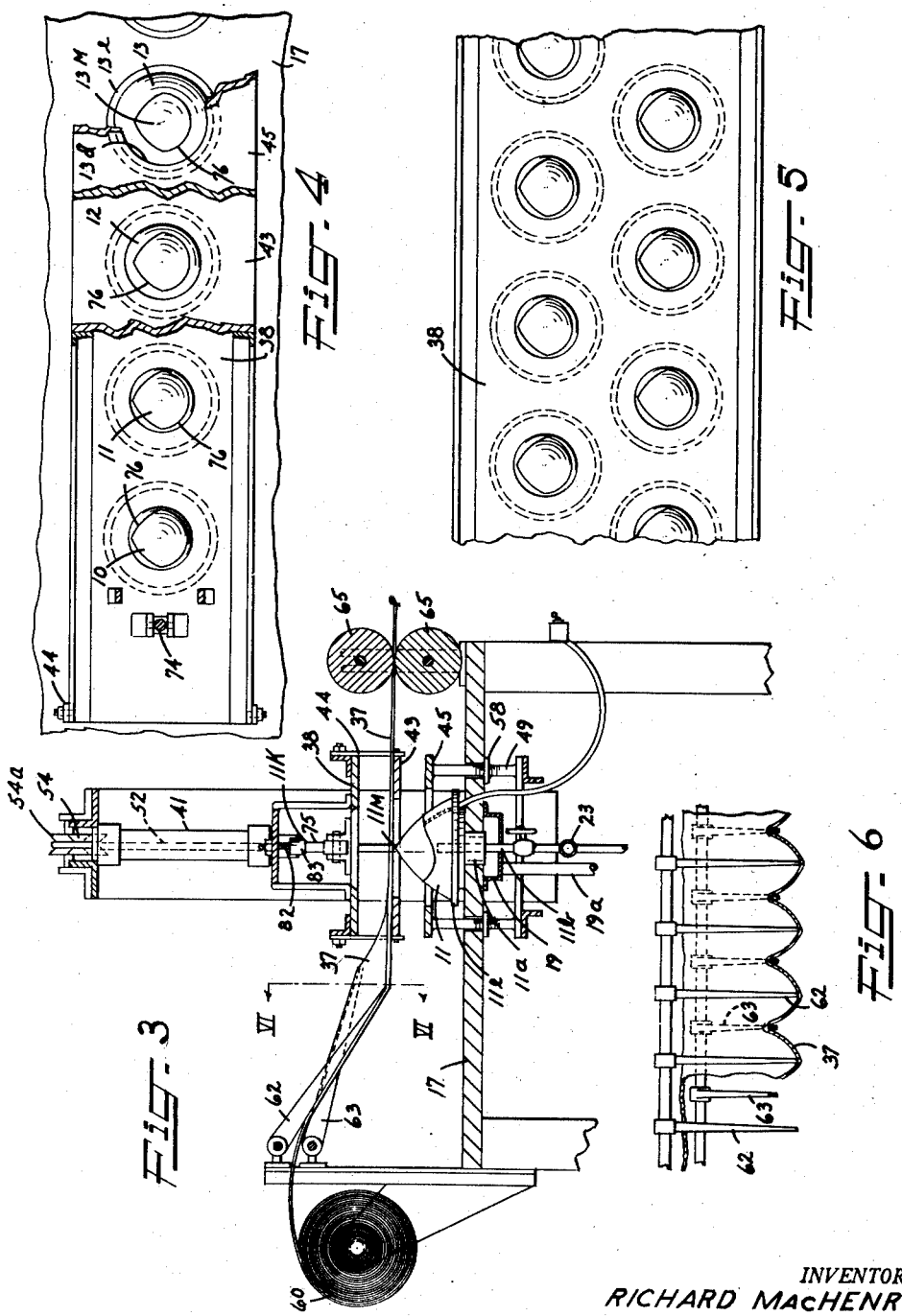
INVENTORS.
RICHARD MacHENRY
CHARLES A. MARTIN
BY
Thomas R. O'Malley Patented Jan. 1, 1952

2,580,566

UNITED STATES PATENT OFFICE 2,580,566

BRA FORMING DEVICE

Richard MacHenry, Prospect Park, and Charles A. Martin, Boothwyn Heights, Pa., assignors to American Viscose Corporation, Wilmington, Del., a corporation of Delaware Application September 4, 1948, Serial No. 47,928

17 Claims. (Cl. 18—19)

This invention relates to the shaping of garments from textile materials comprising thermoplastic resins and particularly to apparatus which may be employed to stretch or shrink a fabric to a desired shape.

The usual practice in manufacturing garments or portions thereof such as headwear, brassières, girdles, or other body-fitting apparel which must be shaped in three-dimensions, consists of forming portions of complicated contour from an assembly of small pieces attached together as by sewing. The separate pieces are cut from flat sheets of fabric or other sheeted materials, and impart to the garment into which they are incorporated somewhat imperfect and unsatisfactory body-fitting characteristics. Moreover such garments are a source of discomfort as the result of contact and friction of the body with the seams and overlapped portions inherent in their construction.

Attempts have also been made to form such body-fitting and body-supporting garments or portions thereof from sheetings of fabric, film, mats, etc., comprising thermoplastic or otherwise heat-reactive materials in order to avoid the multi-piece construction. However, there has been little commercial production of such garments, principally because of the lack of satisfactory apparatus for shaping the body-fitting elements, particularly, a type of apparatus suitable for shaping heat shrinkable materials.

It is an object of this invention to produce thin-wall molded articles from sheet materials comprising heat sensitive resinous compositions. It is another object to provide an apparatus which will effect the molding of a plurality of articles simultaneously. It is a specific object to provide a means for molding articles from woven sheet materials which shrink to a desired shape when placed on a mold and heated. It is still another object to provide an apparatus for molding and severing molded articles from the unmolded portions of a flat sheet material. It is also an object to provide an apparatus adaptable to automatic operation and the forming of a large number of molded articles by a single operation. Other objects, features and advantages will become obvious from the following description of the invention and the drawing in which:

Fig. 1 is a front elevation view partly in section illustrating an embodiment of the invention;

Fig. 2 is a sectional view of a modification of the mold elements shown in Fig. 1;

Fig. 3 is a sectional view of the apparatus shown in Fig. 1 taken along line III—III;

Fig. 4 is a top view of the apparatus illustrated in Fig. 1 with portions broken away at various levels;

Fig. 5 is a top view of a modified apparatus having more than one row of apertures; and Fig. 6 is an elevation of a portion of the apparatus shown in Fig. 3 as viewed from line VI—VI for producing slackness in a sheet material.

Briefly the invention is concerned with obtaining molded articles from a flat continuous sheet of fabric, web, film, or the like of heat-activatable material by passing the sheet by successive sections into an apparatus which presses the sheet under slight tension about one or more molds supported on the apparatus, then heats the areas of sheet stretched over the molds by momentary heating of the molds, and separates the molded portions from the unmolded areas by means of a heating device which quickly heats the material to a fusion temperature along a desired separation path. The sheet is placed or stretched over the molds by a clamping device which may be adjusted to permit any degree of slippage of the sheet between its surfaces as the sheet is distributed over the surface of the molds prior to the heat treatment. The adjustability of the clamping device permits the use of the apparatus in molding materials which are preferably stretched while heated to a plastic state as well as those which are preferably shrunk when subjected to heat.

The invention is highly satisfactory, for example, when employed in the manufacture of brassières. The apparatus of the invention is accordingly hereinafter described with respect to the forming of the breast fitting and supporting elements which constitute portions of brassières. The apparatus to be described is particularly useful in molding material which may be applied simultaneously to the various mold units of the apparatus in such a manner that while the material is subjected to some tension while placed or pressed over the units, it is not subjected to such tension that all of the wrinkles or the slackness is removed in the material, particularly around the base portions of the units. Subsequently, heat is applied to the material and the slackness disappears as the material shrinks into shape about the units. However, the apparatus may be adapted, by merely changing the timing and degree of the sheet clamping pressure, to molding thermoplastic materials which are molded while being simultaneously heated and stretched.

In Fig. 1 an apparatus is shown in elevation having six mold units 10, 11, 12, 13, 14, and 15 such as are used in forming of brassière portions. The apparatus is by no means limited to six units but may contain any number spaced according to any arrangement desired. For example, in the forming of breast supporting cups for brassières it may be desirable to have a single apparatus produce right and left cups in several sizes. In Fig. 5, a plan view is shown in which mold units are arranged in two rows extending transversely of the sheet path with the elements of one row staggered with respect to those of the other row to obtain more economical utilization of the sheet than is obtainable in a machine containing a single row of molds.

The mold elements 10, 11, etc. are secured in any suitable manner to table or frame member 17 such as by screwing an exteriorly threaded tubular portion 12a as illustrated in Fig. 1 into an interiorly threaded aperture in the frame 17, or by set screws (not shown) in the frame 17 intersecting the surface of the tubular portions of the molds. However, the mold units may be of sufficient weight as to not require positive means of attachment to the frame if means for preventing their turning relative to the frame is provided. In the mold elements illustrated in Fig. 1, a heating medium introduced into the elements through any one of the tubes 10b, 11b, etc. is sprayed over the interior of the corresponding mold and escapes freely through the space surrounding the tubes within corresponding tubular sections 10a, 11a, 12a, etc. The escaping heating medium drains onto a catch pan 19 secured to the under surface of the frame member 17 by any suitable means such as the screws 20. The catch pan may be provided with a drain 19a.

It is desirable to cool the molded pieces to a temperature below that producing fusion before removing them from the molds so that they will not be damaged or distorted when subsequently handled. To effect rapid cooling of the molds so that many molding cycles per unit time may be obtained, a cooling medium is circulated through the molds immediately after the heat shrinking operation. When steam is used as the heating medium, the coolant may be cold water. The manifold 23 may be used as illustrated to distribute both the steam and the water to the molds. Steam and water are supplied to the manifold 23 from supply lines 22 and 26 respectively. The catch pan 19 then serves as a collector for the cooling water as well as steam condensate formed within the mold. In the event that a higher temperature is needed to effect molding than is obtainable from circulating steam or other gas through the molds at atmospheric pressure, a mold element 28 is illustrated in Fig. 2 which is suitable for receiving and retaining steam under pressure. Although steam and cooling water may be introduced into the mold through a single inlet duct or tube, a preferable arrangement is as shown wherein steam and cooling water may enter by separate ducts 30 and 31. The interior bottom surface of the mold is dished to facilitate drainage of coolant and condensate into a tube 33 which exhausts into a steam trap 35.

The sheet material 37 from which the molded brassière cups or pockets are formed, is supported in the machine by a clamping assembly comprising an upper plate member 38 supported by push rods 74 and 75 extending from its upper surface into two overhead fluid cylinders 40 and 41, and another plate member 43 loosely suspended from the member 38 by slotted links 44. Plates 38 and 43 each have apertures in alignment with each of the mold elements 10, 11, etc. In the uppermost position of the clamping assembly the plates 38 and 43 are separated as shown in Fig. 1 by sufficient clearance to permit the pulling into position over the molds and between the plates an unperforated section of the sheet. However, preparatory to forming the brassière cups, fluid is forced into the upper ends of cylinders 40 and 41 whereupon plates 38 and 43 are carried downward with a section of sheet 37 resting therebetween. During the descent of plates 38 and 43, a pressure plate 45 is first contacted by plate 43.

Pressure plate 45 is provided with apertures 10d, 11d, etc. so that it may be moved through the elevation range occupied by the molds 10, 11, etc. In the apparatus illustrated, the apertures 10d, 11d, etc. are of such size and shape that the plate 45 clears all portions of the molds and is stopped in its downward movement by the frame member 17. However, other means (described more particularly hereinafter) for stopping the descent of the plate 45 may be easily provided such as spacing blocks or set screws (not shown) secured either to the under surface of plate 45 or the upper surface of the frame member 17.

The assembly of which plate 45 is a portion, is suspended on a weight-pulley-cable arrangement in the manner of a window sash. Pressure plate 45 is supported on a lower parallel bar member 47 by vertical threaded rods 48 and 49 extending between and secured to corresponding end portions of the plate 45 and the bar 47. Suitable apertures are provided in the frame member 17 for extension therethrough of the rods 48 and 49. The pressure plate assembly is supported on cables 51 and 52 which extend vertically through apertures provided in the various members of the apparatus which intersect their paths and over pulleys 53, 53a and 54, 54a respectively, and are secured to weights 55 and 56 respectively. The force exerted by the plate 45 on the clamping plates 38 and 43 may be regulated by varying the size of the weights 55 and 56. The upward movement of the assembly comprising plate 45 and the channel bar 47 is limited by nuts 57 and 58, adjustable along the threaded portions of rods 48 and 49 respectively and which act as stops for the assembly when the nuts engage the lower surface of the frame 17. The position of the nuts 48 and 49 is such that the plate 45 is spaced below the sheet clamping plates 38 and 43 sufficient distance that these plates have sufficient clearance between them in their uppermost position to receive ruffled sheet material. The spacing of plate 45 from these plates is also sufficient to permit plates 38 and 43 to retain their clearance while descending through a range including a substantial part of the molding area of the molds. By permitting clearance between the plates during a portion of their downward movement, the transverse slackness which is intentionally introduced into the sheet by elements 62 and 63 as it enters the apparatus is distributed uniformly over the several molds without developing any appreciable degree of tension of the sheet.

A continuous sheet may be stored in a roll 60 such as seen in Fig. 3 and withdrawn from the roll during operation through two sets of fingers which impart transverse slackness to the sheet 37. The fingers of the set 62 extend between the fingers of the set 63 to develop a channelway for the sheet which folds it into a zigzag pattern observed when looking to a transverse cut taken of the sheet as illustrated in Fig. 6. After passing through the fingers 62 and 63 the sheet has considerable slackness uniformly distributed crosswise of the sheet which facilitates the pressing or placement of the sheet about the molds 10, 11, 12, etc. during descent of the clamping members 38 and 43.

A section of the sheet of suitable length, i. e., a section having a length of approximately the width of the clamping members 38 and 43 as seen in Fig. 3, is drawn through the separated members 38 and 43 by any suitable drawing means such as the nip rolls 65. A four-way valve 67 is then turned to the position wherein fluid flows from a supply line 68 into line 69 which carries the fluid to the upper portions of cylinders 40 and 41. Fluid being exhausted from the lower ends of the cylinders is carried through a line 71 through the valve 67 into a discharge line 72; meanwhile the movement of the pistons (not shown) downward within cylinders 40 and 41 is transmitted to the sheet clamp member 38 by the push rods 74 and 75. During the earlier portion of the downward movement of the plates 38 and 43 during which the plates are separated by the clearance permitted by the slip links 44, the transversely slack sheet 37 becomes distributed over the mold surfaces. The sheet clamping assembly continues its downward movement until the plate 43 reaches and thereafter rests upon pressure plate 45. The presure plate 45 holds the plate 43 motionless until it is engaged by the lower surface of the plate 38 and the sheet 37 therebetween. Thereafter, the three plates 38, 43 and 45 continue downward motion as the result of continued operation of the fluid cylinders 40 and 41 in opposition to the pull of the weights 55 and 56. The sheet 37 is gripped by the plates 38 and 43 at any point below and including the topmost position at which the three plates come together and move in unison. The degree of gripping is such that while appreciable tension is developed in the portions of the sheet covering the molds during downward movement of the three plates, the sheet is not gripped positively but may slide between the plates 38 and 43 in further adjustment to continued distribution of the sheet upon the molds. The downward movement of all three plates stops when the plate 45 engages the top surface of the frame member 17.

With the sheet material stretched over the molds and the downward movement of the plates 38, 43 and 45 completed, the molds are simultaneously heated by turning steam into the manifold 23 and ducts 10a, 10b, etc. from the supply line 22. The sheet material which comprises a resin or other composition of the type which shrinks in response to heating to a temperature near its melting point such as woven filaments of a copolymer containing 85 to 90 percent vinyl chloride and 15 to 10 percent vinyl acetate, shrinks into a neatly fitting covering about each of the molds. The molds are then quickly chilled by stopping the flow of steam and spraying the interior surfaces of the molds with cooling water fed from a supply line 26 through the same duct system used for distributing the steam to the molds.

The molded portions of the sheet are preferably severed from the unmolded portions before its removal from the molds or lifting of the gripping device for the sheet. This may be accomplished by an electrical heating means 76 secured to the surfaces of each of the molds along a path adjacent the desired line separation in the material. One satisfactory arrangement which has been used for severing such molded articles, is a nickel-chromium conductor of the type used in the heating elements of household appliances, embedded in a nonconducting cement contained within a groove cut in the mold. The two ends of such a conductor may be connected with a convenient current source such as an alternating 110-volt current source preferably in parallel with the conductors of other molds of the apparatus and operated by a single switch 77. By energizing the conductors for a few seconds the molded articles may be severed simultaneously from the parent sheet. However, although actual severance occurs in a matter of a second or two after a sufficient heating period of perhaps a couple of seconds for the conductor and the material, the parting of the molded article from the parent sheet is not exactly simultaneous along all portions of the severance path. If one side parts sooner than the other side, the side of the molded article first separated tends to spring away from the adjacent freshly cut edge of the sheet and the whole molded area shifts slightly over the top of the mold allowing the side of the article subjected to slower severing action to shift with respect to the heated conductor. When this happens, severing, if it occurs at all, may occur along undesired path and/or produce ragged severed edges. To prevent shifting of the molded section, knobs 10K, 11K, 12K, etc. are provided which press against the material stretched over the tops of the molds and hold the material from shifting. The knobs or holders are supported on a frame 80 attached to the upper clamp member 38 and therefore follow the clamping assembly during any movement thereof. Consequently, when the clamp is in its lowermost position such as occupied during heating and cooling of the mold and severing of the molded article, holders 10K, 11K, 12K, 13K and 15K bear on the tops 10M, 11M, 12M, etc. of the molds 10, 11, 12, etc. The holders should present a resilient engaging surface to the tips of the molds so as not to injure the fabric or other sheet material stretched over it. Satisfactory holders such as illustrated in Fig. 1 have been constructed comprising a short length of rod 82 having one end threaded for screwing into threaded holes provided in the frame 80, and a knob 83 consisting of a vulcanizate of rubber or rubber-like material into which the other end of rod 82 is secured.

Although the apparatus herein described is extremely suitable for molding materials which have the property of shrinking where heated, the apparatus is readily adjustable for molding sheet materials which are preferably stretched over a mold while in a thermoplastic condition. To adapt the apparatus to mold materials of the latter type, it is merely necessary to provide sufficient weight in place of the weights 55 and 56 to provide positive holding of sheet material against the tension developed in stretching the sheet over the molds. The pressure plate 45 is adjusted to a higher level by changing the adjustment of the nuts 48 and 49 which causes the plates 38 and 43 to positively grip the sheet as it comes in contact with the mold during downward movement of the sheet and the clamp. The slackness producing fingers 62 and 63 are adjusted to put little or no slack in the sheet entering the apparatus. The sheet, in this instance, may be heated exteriorly of the molds by equipment not shown such as infra-red lamps or jets of steam or other hot gas, or by heating the mold according to methods already described. When interiorly heated molds are used in the stretch molding process the molds are preferably so constructed that the tip or the portion of the mold which first contacts the sheet material remains cooler than the remainder of the mold. In using uniformly heated molds the material first contacted is heated to plasticity and may yield to such an extent as to cause rupturing of the material before surrounding portions are in contact with the mold. However, molds having cooler tips permit the portion of the sheet first contacting the mold to reach a plastic temperature at a slower rate. With a mold of the proper design the sheet may be shaped to the later contacted portions of the mold during the period required to bring the material over the tip portion to a plastic condition. Such heating behavior of the molds may be obtained by increasing the thickness of the mold walls or introducing a layer of material of lower heat transfer rate into the portions of the mold which are to remain cooler.

The invention, moreover, is not limited to heating of the sheet from heat applied interiorly of the mold units. Very efficient external means is provided, for example, if plate 38 or 43 takes the form of a thin-walled jacket or hollow member (not shown) having a large number of fine orifices arranged around each of the apertures such as 10d, 11d, 12d, etc. Steam or hot gas may be passed through such a jacket for a few seconds to produce the desired heating effect. Such an expedient is merely illustrative of many ways in which external heating is applicable to the sheet material.

The apparatus of the invention as herein described is controlled by manually operated valves and electrical switches. However, the operation of the apparatus is repetitive and cyclic in nature and is easily controllable by automatic timing means such as a conventional cyclic controller connected with the various valves and switches of the apparatus.

While a preferred embodiment of the invention has been shown, it is to be understood that changes and variations may be made without departing from the spirit and scope of the invention as defined in the appended claims.

What is claimed is:

1. Apparatus for shaping a thermoplastic sheet comprising at least one molding unit having a protuberant surface for engaging one surface of the sheet and having attached to its surface an electrical conductor extending along a path corresponding to the edge of the article to be molded on the unit, an electrical current source for heating the conductor to a temperature which causes separation of the sheet along the portions heated, apertured movable means for gripping an area outside the area to be brought into contact with the unit, means for supporting the unit in the path of movement of the gripping means, means for actuating the gripping means at a predetermined point in its path of movement to exert a predetermined pressure on the sheet, and means for applying heat to all portions of the sheet in contact with the unit.

2. Apparatus for molding articles from a continuous sheeted thermoplastic material comprising a plurality of molds, means for clamping the sheet comprising two holding members movable in a direction normal to their gripping surfaces toward the molds and separatable to permit transferal of the sheet through the means, apertures of sufficient size in the holding members to provide clearance with the molds when the means is moved to any position wherein a plane passing between the gripping surfaces intersects any portion of the molding surfaces of the molds, a yieldable member for engaging and moving one member toward the other to grip the sheet at an intermediate point along the ambit, means attached to the yieldable member resisting the movement of the holding means while carrying the yieldable member before it, stopping means engageable with the yieldable member, and limiting the movement of the member and the holding means toward the supported ends of the molds, sheet holding resilient means for engaging the ends of the molds first contacted by the sheet, heating and cooling means for the molds, heating means secured along the surfaces of the molds for separating the molded portions from the unmolded portions of the sheet.

3. An apparatus as in claim 2 wherein the means attached to the yieldable member is suspended on cables led over pulleys mounted on a frame member of the apparatus supporting weights.

4. An apparatus as in claim 2 wherein the heating means secured along the surface of the molds comprises an electrical conductor and a current source connected therewith capable of heating the conductor to a temperature which severs the material.

5. Apparatus as in claim 2 comprising also a means for producing lateral slackness in the material entering the clamping means.

6. Apparatus as in claim 2 comprising sets of fingers canted to each other with the tips thereof interspaced so that lateral slackness is produced in the sheeting passing between the sets of fingers.

7. A machine for molding brassière pockets from a fabric of thermoplastic material comprising a plurality of hollow molds of which portions thereof are composed of an electrically nonconducting material, an electrical conductor attached to a nonconducting portion of the surface of each mold corresponding to the edge of the brassière pocket, an electrical current source of sufficient power to heat the conductor to a temperature which produces separation in the fabric material in contact therewith, a frame for supporting the molds, duct means leading to the interior of each of the molds for supplying heating medium and cooling medium thereto, a device for holding a section of the sheet above the molds comprising two members having substantially horizontal gripping surfaces and connected to each other by a plurality of slip links, fluid cylinder means for supporting and vertically moving the device, a yieldable horizontal pressure member spaced below the device at a predetermined elevation for resisting the descent of the device and causing the members thereof to grip the fabric material, cables extending over pulleys mounted on the frame of the apparatus each attached by one end to the pressure member and by the other end to a weight, resilient elements supported by the device above the upper member thereof and spaced therefrom to contact the top of the mold when the device is in its lowermost position, and means for producing lateral slack in the material entering the apparatus.

8. Apparatus for shaping a heat-reactive sheet comprising at least one mold unit having a protuberant surface for engaging one side of the sheet and having attached to said surface an electrical conductor extending along a path corresponding to the edge of the article to be molded on the unit, an electrical current source for heating the conductor to a temperature which causes separation of the material along the portions heated thereby, a pair of relatively movable members for gripping an area of the sheet outside the area to be contacted by the unit, means for moving the members relative to the unit, means for supporting the unit in the path of movement of the members, apertures extending through the members permitting extension therethrough of the molding unit during movement of members relative to the unit, means for moving one member toward the other to grip the sheet at a predetermined point in its path of movement at a predetermined pressure, means for applying heat to all portions of the sheet in contact with the unit, means for advancing the sheet by longitudinal sections through the apparatus, and a device for producing transverse slackness in the sections of the sheet entering the gripping means.

9. A sheet handling device comprising two relatively movable gripping members, means for moving both members simultaneously through an ambit along a portion of which the members are separated, means for intermittently moving the sheet in a longitudinal direction through the space between the members while they are separated, and means for producing lateral slack in the sheet and spaced from the members along the portion of the sheet which is advanced toward the members.

10. A sheet handling device as in claim 9 wherein the means for producing lateral slack comprise two sets of fingers canted toward each other with the tips of each set alternately spaced with the tips of the other set to produce slackness in a sheet passing between the sets of fingers.

11. Apparatus for shaping a heat-reactive sheet comprising at least one molding unit having a protuberant surface for engaging one side of the sheet, a pair of relatively movable apertured plates for gripping an area of the sheet surrounding the area to be brought into contact with the unit, means for supporting the molding unit, means for moving both plates in a direction toward and away from the supporting means to vary the extension of the unit through the apertures, means for moving one plate toward the other to grip the sheet at a predetermined point along their path of movement relative to the unit, means for exerting a predetermined pressure of the plates on the sheet, means for limiting the movement of the plates while urged together in sheet-gripping relationship to a position relative to the unit for the purpose of molding said area of the sheet on the unit, a predetermined portion of the unit extending through and beyond the plates and being exposed to the atmosphere except for the material of the sheet when the plates are disposed in the molding position, means for applying heat to portions of the sheet in contact with the unit, means for severing a portion of the sheet within said area when in engagement with the unit from the remainder of the sheet, and means for actuating the severing means.

12. Apparatus for shaping a heat-reactive sheet comprising at least one molding unit having a protuberant surface for engaging one side of the sheet, a pair of relatively movable apertured plates for gripping an area of the sheet surrounding the area to be brought into contact with the unit, means for supporting the molding unit, means for moving both plates in a direction toward and away from the supporting means to vary the extension of the unit through the apertures, means for moving one plate toward the other to grip the sheet at a predetermined point along their path of movement relative to the unit at a predetermined pressure, means for limiting the movement of the plates while urged together in sheet-gripping relationship to a position relative to the unit for the purpose of molding said area of the sheet on the unit, a predetermined portion of the unit extending through and beyond the plates and being exposed to the atmosphere except for the material of the sheet when the plates are disposed in the molding position, means for applying heat to portions of the sheet in contact with the unit, means for severing a portion of the sheet within said area when in engagement with the unit from the remainder of the sheet, and means for actuating the severing means.

13. Apparatus for shaping a heat-reactive sheet comprising at least one molding unit having a protuberant surface for engaging one side of the sheet, a pair of relatively movable plates for gripping an area of the sheet surrounding the area to be brought into contact with the unit, means for moving the plates relative to the unit, means for supporting the molding units in the path of movement of the plates, apertures extending through the plates permitting an extension therethrough of the molding unit during movement of the plates, means for moving one plate toward the other to grip the sheet at a predetermined point along their path of movement relative to the unit at a predetermined pressure, means for limiting the movement of the plates while urged together in sheet-gripping relationship to a position relative to the unit for the purpose of molding said area of the sheet on the unit, a predetermined portion of the unit extending through and beyond the plates and being exposed to the atmosphere except for the material of the sheet when the plates are disposed in the molding position, means for applying heat to the surface of the unit, means for severing a portion of the sheet within said area when in engagement with the unit from the remainder of the sheet, and means for actuating the severing means.

14. Apparatus for shaping a heat-reactive sheet comprising at least one hollow molding unit having a protuberant surface for engaging one side of the sheet, a pair of relatively movable plates for gripping an area of the sheet surrounding the area to be brought into contact with the molding unit in a plane normal to the direction of movement of the plates, means for moving the plates relative to the unit, means for supporting the unit, apertures extending through the plates and disposed to permit extension therethrough of the molding unit during movement of the plates relative to the unit, means for moving one plate toward the other to grip the sheet at a predetermined plane along their path of movement at a predetermined pressure, means for limiting the movement of the plates while urged together in sheet-gripping relationship to a position relative to the unit for the purpose of molding said area of the sheet on the unit, a predetermined portion of the unit extending through and beyond the plates and being exposed to the atmosphere except for the material of the sheet when the plates are disposed in the molding position, means for supplying a heating medium to the interior of the unit, means for severing a portion of the sheet within said area when in engagement with the unit from the remainder of the sheet, and means for actuating the severing means.

15. Apparatus for shaping a heat-reactive sheet comprising at least one hollow molding unit having a protuberant surface for engaging one side of the sheet, a pair of relatively movable plates for gripping an area of the sheet surrounding the area to be brought into contact with the molding unit in a plane normal to the direction of movement of the plates, means for moving the plates relative to the unit, means for supporting the unit in the path of movement of the plates, apertures extending through the plates disposed to permit extension therethrough of the molding unit during movement of the plates relative to the unit, means for moving one plate toward the other to grip the sheet at a predetermined plane along their path of movement at a predetermined pressure, means for limiting the movement of the plates while urged together in sheet-gripping relationship to a position relative to the unit for the purpose of molding said area of the sheet on the unit, a predetermined portion of the unit extending through and beyond the plates and being exposed to the atmosphere except for the material of the sheet when the plates are disposed in the molding position, means for introducing steam into the unit, means for cooling the unit, means for severing a portion of the sheet within said area when in engagement with the unit from the remainder of the sheet, and means for actuating the severing means.

16. Apparatus for shaping a thermoplastic sheet comprising at least one hollow molding unit having a protuberant surface for engaging one side of the sheet, movable means for gripping an area of the sheet surrounding the area to be brought into contact with the molding unit in a plane normal to the direction of movement of the gripping means, means for supporting the unit, means for actuating the gripping means to grip the sheet at a predetermined plane along its path of movement at a predetermined pressure, means for limiting the movement of the movable means while urged into sheet-gripping relationship to a position relative to the unit for the purpose of molding said area of the sheet on the unit, a predetermined portion of the unit extending through and beyond the movable means and being exposed to the atmosphere except for the material of the sheet when the movable means is disposed in the molding position, conduit means connected with the unit for supplying a fluid heat-transfer medium thereto, conduit means connected with the unit for carrying said medium therefrom, means for severing a portion of the sheet within said area when in engagement with the unit from the remainder of the sheet, and means for actuating the severing means.

17. Apparatus for shaping a sheet of material comprising at least one molding unit, said unit having a protuberant surface for engaging only one side of the sheet, a pair of relatively movable apertured plates for gripping opposite sides of the sheet around the area to be brought into contact with the unit, means for supporting the unit, means for moving both plates in a direction toward and away from the supporting means to vary the extension of the unit through the apertures, means for moving one plate toward the other to grip the sheet at a predetermined pressure such that the sheet may slide with respect to the surfaces of the plate without stretching it a predetermined point along the path of movement of the plates relative to the unit, stop means for terminating the movement of the plates toward the supporting means and for increasing the pressure between the plates to obtain positive gripping of the sheet, a predetermined portion of the unit extending through and beyond the plates and being exposed to the atmosphere except for the material of the sheet when the plates are disposed in the molding position, means for severing a portion of the sheet within said area when in engagement with the unit from the remainder of the sheet, and means for actuating the severing means.

RICHARD MacHENRY.
CHARLES A. MARTIN.

REFERENCES CITED

The following references are of record in the file of this patent:

UNITED STATES PATENTS

| Number | Name | Date |
|---|---|---|
| 1,435,985 | Scohy | Nov. 21, 1922 |
| 1,548,108 | Sweet | Aug. 4, 1925 |
| 1,671,577 | Gluckin et al. | May 29, 1928 |
| 1,760,288 | Stevens | May 27, 1930 |
| 1,968,826 | Graf | Aug. 7, 1934 |
| 2,179,692 | Fuchs | Nov. 14, 1939 |
| 2,304,989 | Snowden | Dec. 15, 1942 |
| 2,357,706 | Toepperwein | Sept. 5, 1944 |